Patented Nov. 8, 1949

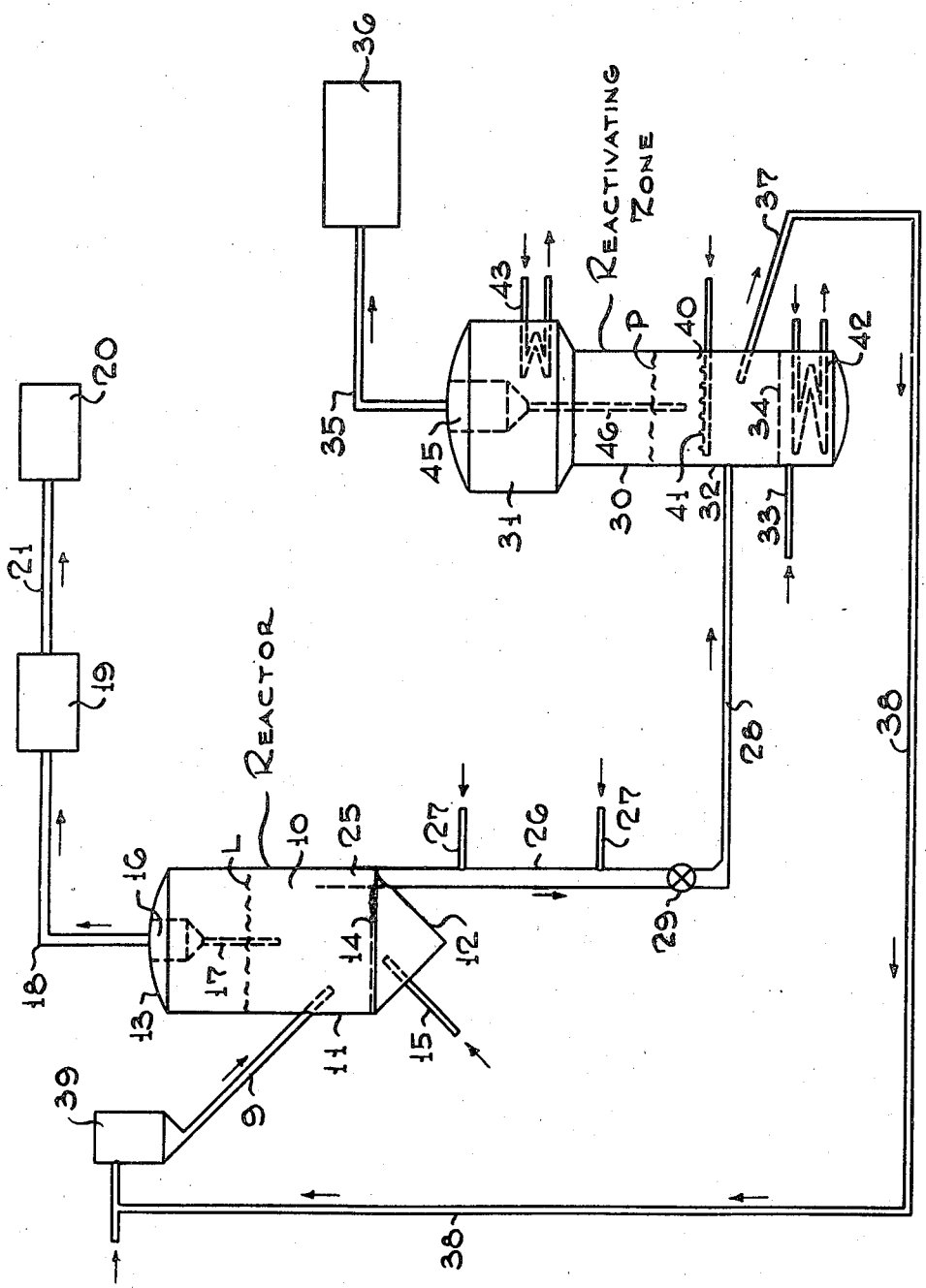

2,487,159

UNITED STATES PATENT OFFICE 2,487,159

REGENERATION OF IRON TYPE HYDROCARBON SYNTHESIS CATALYST

Don R. McAdams and Marnell A. Segura, Baton Rouge, La., assignors to Standard Oil Development Company, a corporation of Delaware Application October 9, 1947, Serial No. 778,866

6 Claims. (Cl. 260—449.6)

This invention relates to the synthesis of hydrocarbons particularly by the hydrogenation of the oxides of carbon. The invention relates more particularly to the improvement of iron containing catalysts in the catalytic synthesis of normally liquid hydrocarbons by the reaction of carbon monoxide and hydrogen.

The hydrogenation of the oxides of carbon in the presence of cobalt as a catalyst as a means for synthesizing high molecular weight hydrocarbons has been known for some time. The reaction in such processing is largely carried out in reactors containing the catalytic material in fixed or stationary beds. The hydrocarbon product contains straight chain paraffins predominantly and therefore, is not generally utilized as a motor fuel. Improvements in processing for the production of hydrocarbons of good motor fuel quality have been made by employing catalysts containing predominantly iron especially in fluidized form in the reaction vessel. The present invention is a further development in this field and involves the employment of fluidized promoted iron catalyst.

The iron type catalyst employed in the more recent synthesis operations is usually prepared by roasting pyrites ore, after removal of siliceous materials, or iron sulfide at a temperature from 1200° F. to 1500° F. to remove a major portion of the sulfur, and then sintering at a temperature between about 2000° F. and 2500° F. thus removing any remaining sulfur. The resulting products are ground, sized and then reduced, usually by the means of hydrogen, before use. Other forms of iron catalyst may be obtained by fusing magnetite (synthesis ammonia catalyst) or by heating ferrous sulfate, ferrous oxalate or ferric hydroxide to temperatures above about 1300° F. For fluid catalyst operations, the size of the catalyst particles is particularly important. When the particles are too fine and not of suitable size, the catalyst bed does not become suitably fluidized, that is, the solid particles and the reacting gases do not distribute themselves evenly throughout the bed. A suitable fluidized catalyst mass resembles a boiling liquid with the catalyst loosely packed, the individual solid particles being in a highly agitated state with no large gas cavities appearing throughout the fluidized mass.

It has been found that in synthesis operations employing a fluidized iron catalyst, no substantial portion of the catalyst should have a particle size below 10 microns and a major portion of the catalyst should have a particle size of at least 20 microns. A satisfactory fluidized catalyst mass is one which, for example, has the following particle sizes and distribution:

Below 20 microns up to about 35%,
Between 20 and 40 microns between 5 and 25%,
Between 40 and 80 microns between 5 and 25%, and
Above 80 microns from about 15 to 50%.

In synthesis operations, however, the iron type catalyst disintegrates to sizes unsuitable for proper fluidization and causes non-uniform temperatures, expansion of bed, etc. and a high rate of entrainment of the catalyst in the reaction products. The treatment of the catalyst mass according to the present invention reduces fragmentation or the physical disintegration of the catalyst material.

In hydrocarbon synthesis operations employing powdered iron in the form of a fluidized mass, physical disintegration of this catalyst occurs as a result mainly of the deposition of carbonaceous material on the surface during processing. The contamination of the catalyst with carbonaceous material during processing limits the period of operation and necessitates reworking the catalyst by sintering or the like. After such reworking, it is usually necessary to submit the mass to regrading in order to return to the synthesis system only such portion of the catalyst material as is of suitable size for fluidization.

The present invention is a means by which a fluidized iron type catalyst contaminated with carbonaceous material and, therefore, tending to undergo fragmentation of the mass, as a result of use in the hydrogenation of the oxides of carbon may be removed from the reactor before fragmentation has occurred, subjected to steaming to remove some of the carbonaceous deposit, then to an oxidizing treatment to remove a further quantity of the carbonaceous material and then returned without sintering, regrinding, or chemical reduction to the synthesis reactor.

It is an object of the invention, therefore, to maintain the desirable fluidizing characteristics of a finely divided iron type catalyst employed in the hydrogenation of the oxides of carbon. It is another object of the invention to overcome the harmful effect of carbonaceous contamination of the catalyst and avoid fragmentation of the mass without removing all the carbonaceous material. It is also an object of the invention to overcome the need for chemical reduction and for regrinding prior to its re-use as a catalyst material in further synthesis treatment. Other objects will be apparent from the subsequent description of the invention.

The invention involves removing from the hydrocarbon synthesis reactor the iron type catalyst before substantial deposition of carbon has occurred and the treatment of the withdrawn catalyst with steam for a period of time usually from 4 to 12 hours at a temperature between about 600° F. and 1200° F. and preferably from about 800° F. to 900° F. followed by heating in an oxidizing atmosphere at a temperature of 750° F. and 1000° F. and preferably from about 825° F. to 900° F. These treatments of the catalyst material are controlled so as to prevent complete removal of the carbon from the surface of the catalyst but merely to increase the oxygen content of the catalyst. A suitable reactivated catalyst is one which has a carbon content by weight of about 5% and an oxygen content of about 25%. A product of such characteristics is suitable for further use in a hydrocarbon synthesis operation and gives good selectivity without undergoing further treatment such as treatment in a reducing atmosphere. By such processing, moreover, the reactivated catalyst does not need to be reground or regraded nor is any reducing treatment required prior to recharging to the unit. In order that the invention may be more fully understood, the following specific description and accompanying drawing flow plan of a particular embodiment are presented.

In the drawing, a hydrocarbon synthesis fluid reactor 10 is shown as consisting of a cylindrical shell 11, a conical shaped base 12 and a convex top 13. Within the reactor near the base of the cylindrical portion is a screen or grid 14. Above the screen 14 is shown a mass of fluidized powdered catalyst admitted to the unit through line 9 which has an upper dense phase level at a point L some distance from the top of the reaction vessel. The catalyst in the reactor 10 is an iron type catalyst of particle size within the range from 10 to 200 microns with over 65% having a particle size greater than 20 microns. A mixture of hydrogen and carbon monoxide in molecular ratio determined by the nature of the desired products and the temperature and pressure conditions prevailing are passed into the reactor below the grid 14 through line 15. The gaseous mixture passes upwards through the grid or screen 14 and thus distributes itself relatively uniform upwards through the catalyst mass.

For purposes of particular illustration as to the processing conditions for the preparation of high octane rating gasoline, a feed gas is supplied through line 15 containing hydrogen and carbon monoxide in the ratio of 0.5 to 2 volumes of hydrogen per volume of carbon monoxide. Process conditions within the vessel 10 are a temperature between 300° F. and 800° F., generally in the range of 450° F. to 700° F. and a pressure from 1 to 100 atmospheres. In some cases also, water vapor in small percentages is added with the hydrogen and carbon monoxide to reduce carbon formation upon the catalyst. The gas and/or vapors in the reaction vessel 10 flow upwardly at a controlled rate usually from about 0.1 to 5 ft. per second superficial velocity and preferably with a superficial velocity from 0.3 to 1.5 ft. per second.

The mass of catalyst above the grid 14 in the reaction vessel 10 appears under such conditions as a dense, turbulent, ebullient mass of powdered and gasiform material. Within the reaction vessel 10 as a result of the fluidized condition of the catalyst, very uniform temperatures and pressures prevail throughout the vessel even though the bed may vary in depth from about 1 to 15 ft. or more with a diameter of between 8 and 10 ft. Above the dense phase level L, a dilute phase with catalyst concentration decreasing upwardly occurs. The space above the dense phase level L determines, especially when this upper portion of the vessel is enlarged, the amount of catalyst fines precipitated from the dilute phase and thus reduces the number of solid separating devices such as "cyclones." One or more solid separating devices 16 of the type of cyclones are usually, however, disposed in the uppermost portion of the reactor to remove catalyst and return it through dip-pipes 17 to the dense phase and prevent it from passing overhead with the reaction vessel products through line 18.

The unreacted gases and reaction vapors pass through line 18 from the top of the reaction vessel substantially free of catalyst fines. If further removal of catalyst fines is desired, the product removed through line 18 may be passed through additional mechanical separating device, through filters or by scrubbing the vapors with a liquid. This additional catalyst removing equipment is indicated in the drawing at 19. The unreacted gas and product vapors substantially free of catalyst are then passed through line 21 to a purification and recovery system 20. In equipment 20, the mixture of unreacted gases and vapors are subject to cooling, settling, fractional distillation, etc. according to conventional methods for recovery of the desired products such as are known in the art.

In order to maintain a high degree of activity of the catalyst, a portion of the catalyst is continuously withdrawn through line 25 just above the grid 14 and passed into the standpipe 26. The standpipe 26 is fitted with a number of gas taps 27 through which fluidizing gas is injected in small amounts to aid in maintaining the catalyst flow downwards in the standpipe. The fluidized mass then passes through line 28 to the reactivating unit 30. The rate of discharge of catalyst from the reactor 10 to the reactivating vessel 30 is controlled by the valve 29.

The reactivation vessel 30 is shown as consisting of an upper expanded section 31 and a lower more restricted cross-sectional area 32. The fluidized material admitted into the vessel 30 is of reduced selectivity due to a deposition on the surface of a small amount of carbonaceous material, or the material may have an amount of carbonaceous deposit such that a greater quantity would cause disintegration of the catalyst.

The catalyst in the vessel 30 forms a dense fluidized mass maintained as such by the injection through line 33 near the base of steam in a controlled amount usually between 0.3 ft. per second and 2.0 ft. per second. Some distance above the inlet pipe 33 is the grid 34 as a distributing means for the steam admitted through line 33. The injection of the steam through the fluidized mass maintained at a level P causes some of the carbonaceous material to be removed from the surface of the material. The temperature is maintained between 800° F. and 900° F. Passing overhead from the vessel 30 through line 35 and cyclone separators 45 are the steam and the volatile products. The catalyst fines from the cyclone are returned to the unit through dip-pipe 46. These products are treated in equipment 36 for recovery of such components as desired by cooling, condensing, distillation, etc.

After a period of treating with steam varying from 4 to 12 hours, the steam admitted through line 33 is discontinued and an oxidizing gas, usually air, is passed through line 33 at the rate of 25 v./v./hr. and 200 v./v./hr. Conditions especially as to the time of treatment and the velocity of the oxidizing stream over the material, in this portion of the processing are maintained to prevent complete oxidation of the carbon on the surface of the catalyst. Usually with the rate of oxygen admitted through line 33 over a period varying between a catalyst containing about 5% carbon and 25.5% oxygen is obtained. The catalyst is removed through line 37 thence through standpipe 38 and into the catalyst hopper 39, and returned as desired to the vessel 10, through line 9.

In some cases, the steaming and oxidation treatment may be carried out in the same vessel at the same time by the injection of the steam at a lower level than that of the oxidizing gas into the dense fluidized mass. For the reaction unit 30, the steam may be admitted through line 33 below the grid 34 while the oxygen-containing gas admitted at the higher level through line 40. The oxygen-containing gas may be admitted either as a series of pipes about the level of 40 or through a sprayhead 41. Under such conditions of processing, a heating unit may be used in the lower portion of the vessel while a cooling unit at the upper portion of the tower indicated by the numerals respectively 42 and 43.

Furthermore, by varying the velocity of the gases admitted particularly through line 33, the material removed through line 37 may be subject to an aeriform classification so that the material removed through line 37 may be of suitable size for recycling into the reaction vessel 10.

As a particular example of processing according to the invention a used iron type catalyst analyzing 10% carbon and about 16% oxygen was steamed for about 11 hours at a temperature of 870° F. The catalyst mass was then treated with air for 8 hours at a temperature from about 830° F. to about 890° F. Upon analysis the product was found to contain 4.2% carbon, 25.5% oxygen and X-ray analysis showed $Fe_3O_4$. This material was tested as a catalyst material with and without first reducing with hydrogen. Collected oil yields on the unreduced catalyst ranged from 79 to 110 cc. per cubic meter of hydrogen and carbon monoxide fed. The output data are as follows:

TABLE I

*Pyrites+1% KF*

[Temp., 600° F.; Press., 250 p. s. i. g.; v./v./hr.,[1] 200]

| Reduction | None | | $H_2$, 900° F., 6 Hrs. | |
|---|---|---|---|---|
| Feed, $H_2$/CO Ratio | 1.17 | 2.0 | 1.17 | 2.0 |
| cc. Oil/m.³ $H_2$+CO Fed | 110 | 79 | 113 | |
| cc. $C_4$+/m³ $H_2$+CO Cons | 176 | 155 | 179 | 148 |
| CO Conv. percent, Output | 82 | 87 | 98 | 97 |

[1] Standard volumes of gas per volume of catalyst per hour.

Comparison of the yields of the $C_4$+ hydrocarbons with the catalyst materials employed in the reaction show that the unreduced catalyst has selectivity as good as that of the reduced catalyst.

TABLE II

| | |
|---|---|
| Feed $H_2$/CO ratio | 1.25/1 |
| Temperature °F | 600 |
| Pressure p. s. i. g. | 300 |
| Cc. $C_4$+/M³ $H_2$+CO consumed | 138 |
| CO conversion, output per cent | 94 |

The data in Table II were obtained with the same catalyst under comparable conditions as those of Table I except without treatment according to the invention. Comparison of the data in Tables I and II shows that the reactivated unreduced catalyst while showing an improvement in selectivity (yields of $C_4$+ hydrocarbons) also shows a decline in activity (94% CO conversion before treatment, 82 to 87% after treatment but unreduced, 97 to 98% after treatment but reduced). This decline in activity is insignificant since the time consuming and expensive step of pre-reduction treatment is omitted.

What is claimed is:

1. A method of maintaining the fluidization characteristics of a finely divided iron type catalyst employed in the reaction of hydrogen and carbon monoxide under fluidized catalyst conditions which comprises steaming said iron catalyst at a temperature of about 600° F. to about 1200° F. heating the resultant material in an oxidizing atmosphere at a temperature between about 750° F. and about 1000° F. and immediately utilizing the thus treated mass unchanged as catalyst in the reaction of hydrogen and carbon monoxide.

2. A method of maintaining the fluidization characteristics of a finely divided iron type catalyst according to claim 1 in which said steaming and said heating operations are effected in a single reaction zone.

3. A method of maintaining the fluidization characteristics of a finely divided iron type catalyst according to claim 1 in which the steaming is effected between 800° F. and 900° F. for a period of time from about 4 to about 12 hours.

4. A method of maintaining the fluidization characteristics of a finely divided iron type catalyst according to claim 1 in which the said heating of the resultant material in the oxidizing atmosphere is effected at temperature between about 825° F. and about 900° F.

5. A method of maintaining the fluidization characteristics of a finely divided iron catalyst currently employed in the reaction of hydrogen and carbon monoxide under fluidized catalyst conditions and containing by weight about 10% carbon and about 16% oxygen which comprises steaming said iron catalyst for about 11 hours at a temperature of about 870° F. then heating the resultant material in air for about 8 hours at a temperature from about 830° F. to about 890° F. to reduce the carbon content by weight to between 3 and 5% by weight and immediately returning the thus treated mass unchanged as catalyst in the reaction between hydrogen and carbon monoxide.

6. A method of maintaining substantially continuous use of a finely divided iron base catalyst for the reaction between the oxides of carbon and hydrogen under fluidized catalyst conditions which comprises passing steam through said finely divided iron base catalyst in the fluidized condition to effect removal of some of the carbonaceous material from the surface of said finely divided catalyst at a temperature from about 600° F. to about 1200° F. for a period of between about 4 to 12 hours, then passing an oxygen-containing gas through the resultant material at a temperature between about 750° F. and about 1000° F. at a rate between about 20 v./v./hr. and 200 v./v./hr. for about 8 hours to oxidize a substantial quantity of the carbonaceous material remaining on the surface of said resultant material and immediately utilizing the thus treated mass unchanged as catalyst in the hydrogenation of the oxides of carbon.

DON R. McADAMS.
MARNELL A. SEGURA.

REFERENCES CITED

The following references are of record in the file of this patent:

UNITED STATES PATENTS

| Number | Name | Date |
|---|---|---|
| 1,908,338 | Franceway | May 9, 1933 |
| 2,348,418 | Roesch et al. | May 9, 1944 |

FOREIGN PATENTS

| Number | Country | Date |
|---|---|---|
| 102,646 | Australia | Nov. 30, 1937 |